(12) United States Patent
Tsai

(10) Patent No.: US 9,865,927 B2
(45) Date of Patent: Jan. 9, 2018

(54) SENSOR PAD TO CAPACITIVELY COUPLE TO AN ANTENNA MODULE

(71) Applicant: HEWLETT-PACKARD DEVELOPMENT COMPANY, L.P., Houston, TX (US)

(72) Inventor: Ming-Shien Tsai, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/118,586

(22) PCT Filed: Apr. 3, 2014

(86) PCT No.: PCT/US2014/032831
§ 371 (c)(1),
(2) Date: Aug. 12, 2016

(87) PCT Pub. No.: WO2015/152925
PCT Pub. Date: Oct. 8, 2015

(65) Prior Publication Data
US 2017/0062905 A1    Mar. 2, 2017

(51) Int. Cl.
*H01Q 1/24*     (2006.01)
*H01Q 9/04*     (2006.01)
*H01Q 5/378*    (2015.01)

(52) U.S. Cl.
CPC .......... *H01Q 9/0421* (2013.01); *H01Q 1/243* (2013.01); *H01Q 1/245* (2013.01); *H01Q 5/378* (2015.01); *H04M 2250/12* (2013.01)

(58) Field of Classification Search
None
See application file for complete search history.

(56) References Cited

U.S. PATENT DOCUMENTS

| 7,911,387 | B2 | 3/2011 | Hill et al. | |
| 8,432,322 | B2* | 4/2013 | Amm | H01Q 1/243 324/658 |
| 8,537,128 | B2 | 9/2013 | Uttermann et al. | |
| 2009/0143028 | A1 | 6/2009 | Kim | |
| 2010/0321325 | A1 | 12/2010 | Springer et al. | |
| 2011/0012793 | A1 | 1/2011 | Amm et al. | |
| 2011/0298674 | A1* | 12/2011 | Hsu | H01Q 1/2266 343/703 |
| 2012/0214412 | A1 | 8/2012 | Schlub et al. | |
| 2013/0029625 | A1 | 1/2013 | Park et al. | |
| 2013/0135157 | A1* | 5/2013 | Tsou | H01Q 1/2266 343/702 |
| 2013/0172045 | A1 | 7/2013 | Caballero et al. | |
| 2013/0328741 | A1 | 12/2013 | Degner et al. | |
| 2014/0002305 | A1* | 1/2014 | Hsu | H01Q 1/245 342/368 |

(Continued)

FOREIGN PATENT DOCUMENTS

TW    201307857    2/2016

OTHER PUBLICATIONS

Vullers, R., et al.; "RF Harvesting Using Antenna Structures on Foil"; Nov. 9-12, 2008; 4 pages.

*Primary Examiner* — Trinh Dinh
(74) *Attorney, Agent, or Firm* — HP Inc Patent Department

(57) ABSTRACT

An example computing system may include a proximity sensor including a sensor pad with a tail and an antenna to capacitively couple to the tail to increase a bandwidth of the antenna.

15 Claims, 5 Drawing Sheets

(56) References Cited

U.S. PATENT DOCUMENTS

| | | | |
|---|---|---|---|
| 2014/0010376 A1 | 1/2014 | Veluppillai et al. | |
| 2014/0111684 A1* | 4/2014 | Corbin | H01Q 1/243 348/374 |
| 2014/0127993 A1* | 5/2014 | Frankland | G06K 19/0726 455/41.1 |
| 2014/0162734 A1* | 6/2014 | Shewan | H01Q 9/0421 455/575.7 |
| 2014/0340265 A1* | 11/2014 | Vazquez | H01Q 9/42 343/702 |
| 2015/0022403 A1* | 1/2015 | Lin | H01Q 1/44 343/702 |
| 2015/0380804 A1* | 12/2015 | Lim | G06F 1/162 343/702 |
| 2016/0065260 A1* | 3/2016 | Heikura | H04B 1/3838 455/575.5 |
| 2016/0226143 A1* | 8/2016 | Chen | H01Q 5/10 |
| 2017/0059413 A1* | 3/2017 | Honjo | G01J 5/0025 |

* cited by examiner

SENSOR PAD TO CAPACITIVELY COUPLE TO AN ANTENNA MODULE

BACKGROUND

A number of electronic devices today are capable of communicating data wirelessly. Examples of such devices may include, but are not limited to, mobile phones, smart phones, tablet computers, and notebook computers, among others. During use, devices may come into proximity or direct contact with a user, which may result in electromagnetic radiation emitted from the device being absorbed by the user's body. A measurement of such energy is specified as a specific absorption rate ("SAR"). In some cases, an electronic device is subject to regulatory SAR limits to limit exposure of radiation to users.

BRIEF DESCRIPTION OF THE DRAWINGS

The detailed description section references the drawings, wherein.

Figure 1:
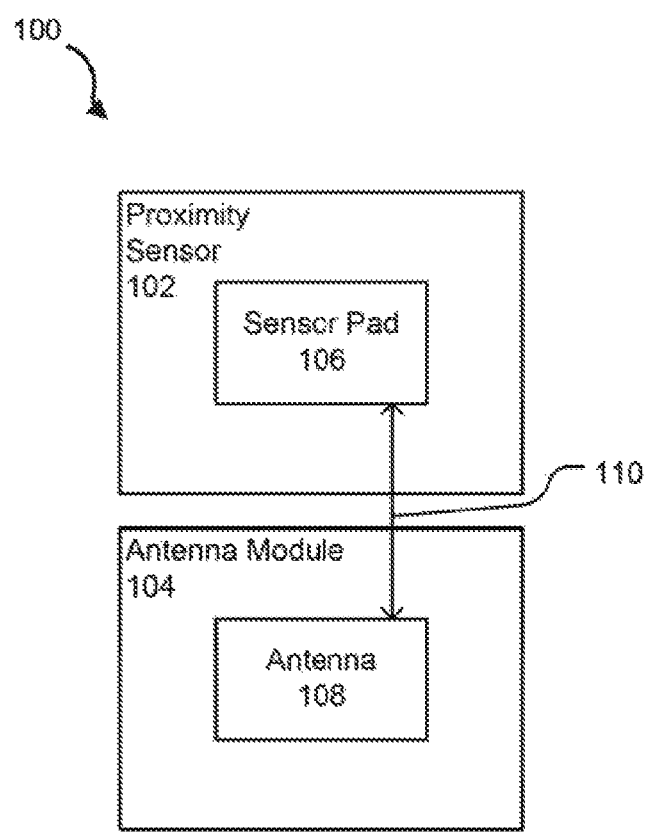
FIG. 1 is a block diagram of an example computing system including a sensor pad to capacitively couple to an antenna module.

all in which various embodiments may be implemented.

Examples are shown in the drawings and described in detail below. The drawings are not necessarily to scale, and various features and views of the drawings may be shown exaggerated in scale or in schematic for clarity and/or conciseness. The same or similar part numbers may designate the same or similar parts throughout the drawings.

DETAILED DESCRIPTION OF EMBODIMENTS

Electronic devices including, but not limited to, mobile phones, smart phones, tablet computers, and notebook computers may transmit and receive data wirelessly via an antenna. The data may include images, text, video, or other data.

Electronic devices commonly come into proximity or direct contact with a user, which may result in electromagnetic radiation emitted from the device being absorbed by the user's body. In some cases, radiation-related thresholds may exist for limiting the exposure of radiation to users. An example of a radiation-related threshold is a specific absorption rate ("SAR"), which refers to a measure of rate at which energy is absorbed by the human body when exposed to electromagnetic radiation. SAR can be expressed as power absorbed per mass of tissue.

To satisfy a radiation-related threshold, electronic devices may be configured with reduced transmission power. Rather than employing complete reduction of transmission power, some electronic devices may be configured to adjust the transmission power depending on the proximity of the device to the user. Devices may include, for example, specialized sensors for detecting the proximity of a user for controlling the transmission power of the device. Proximity sensors, for example, may detect a user in proximity to the antenna of the device.

Described herein are embodiments of computing systems and apparatuses including a proximity sensor including a sensor pad with a tail and an antenna to capacitively couple to the tail. In various implementations, the capacitive coupling of the tail of the sensor pad to the antenna may increase the bandwidth of the antenna by reducing return loss, as compared to systems in which such capacitive coupling is absent.

FIG. 1 is a block diagram of an example computing system 100 including a proximity sensor 102 and an antenna module 104, in accordance with various implementations described herein. The proximity sensor 102 may include a sensor pad 106 and the antenna module 104 may include an antenna 108. Although FIG. 1 depicts the proximity sensor 102 as being separate from the antenna module 104, in at least some implementations the proximity sensor 102 may be integrated in the antenna module 104.

The computing system 100 may be a stand-alone device or may be incorporated into any apparatus or system. Examples of computing systems may include, but are not limited to, desktop computers, notebook computers, hand-held computers, tablet computers, netbook computers, convertible computers, display devices, servers, set-top boxes, digital recorders, game consoles, smart phones, personal digital assistants, mobile phones, digital media players, televisions, or digital cameras.

The proximity sensor 102 may be configured to detect the presence of nearby objects, such as a user of the computing device 100. In various implementations, the proximity sensor 102 may be a capacitive sensor, a capacitive photoelectric sensor, an inductive proximity sensor, or another proximity sensor. In many embodiments, the proximity sensor 102 is a capacitive proximity sensor configured to detect a frequency charge and discharge associated with changes in a user's proximity. In at least some of these implementations, the sensor pad 106 may comprise one or more conductive materials such as, for example, a conductive foil comprising copper, aluminum, or the like.

The antenna 108 may be within a threshold distance 110 of at least a portion of the sensor pad 106 such that the antenna 108 may capacitively couple to the portion of the sensor pad 106, due at least in part to the proximity of the antenna 108 to the sensor pad 106, to increase a bandwidth of the antenna 108 by reducing return loss, as compared to systems in which such capacitive coupling is absent. In at least some implementations, for example, return loss may be improved about 1 dB at 1.71 GHz~1.85 GHz and 2 dB at 1.9 GHz~2.2 GHz. The antenna 108 may be configured to transmit and receive signals over a range or range of bandwidths. The antenna 108 may be configured to operate over high-frequency bandwidth networks such as, for example, long term evolution (LTE), worldwide interoperability for microwave access (WiMax), code division multiple access (CDMA), global system for mobile communications (GSM), or the like. In these implementations, the proximity sensor 102 may utilize low-frequency charges whereas the antenna 108 may utilize higher frequencies associated with data communication such that the proximity sensor 102 will have little or no impact on the high-frequency data transmission needed for wireless communication over the antenna 104.

Figure 2:
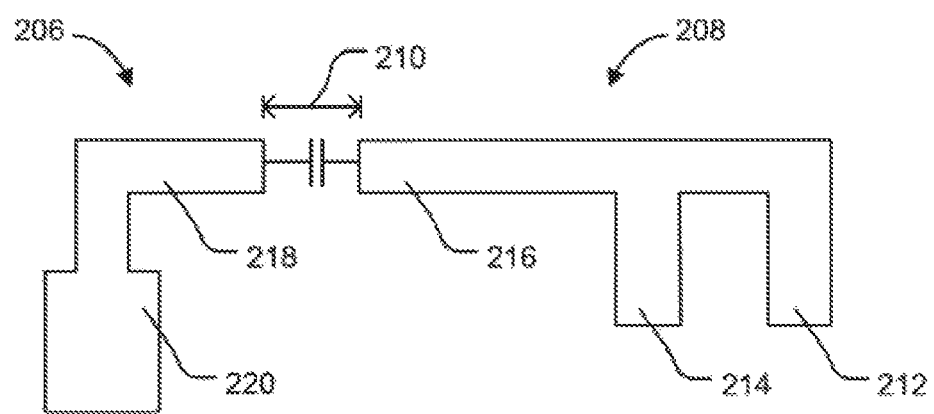
FIG. 2 illustrates an example of capacitive coupling between a sensor pad and an antenna module.

FIG. 2 illustrates an example of capacitive coupling between the proximity sensor pad 206 and an antenna 208 in accordance with various implementations described herein.

As shown in this example, the antenna 208 comprises an inverted-F antenna having a shorting pin 212, a feeding point 214 (input/output), and a radiating element 216. A tail 218 of the sensor pad 206 may be disposed within a threshold distance 210 of the radiating element 216 such that the tail 218 and the radiating element 216 capacitively couple. In this arrangement, the tail 218 of the sensor pad 206 may function as a parasitic stub off of the main body 220 of the sensor pad 206. In various implementations, the tail 218 may comprise any portion of the sensor pad 206 that is not directly coupled to a measurement circuit of the proximity sensor but instead is a portion of the sensor pad 206 that is connected at one end only to the main body 220, with the free end of the tail 218 left unconnected so as to function as a parasitic stub. As such, in many implementations, the tail 218 may be referred to a stub. Although the threshold distance 210 may depend in some instances on the particular arrangement and configuration of the sensor pad 206 and the antenna 208, the threshold distance 210 for at least some implementations may be about 3 mm or less than 3 mm. In other implementations, the threshold distance 210 may be greater than 3 mm.

Figure 3:
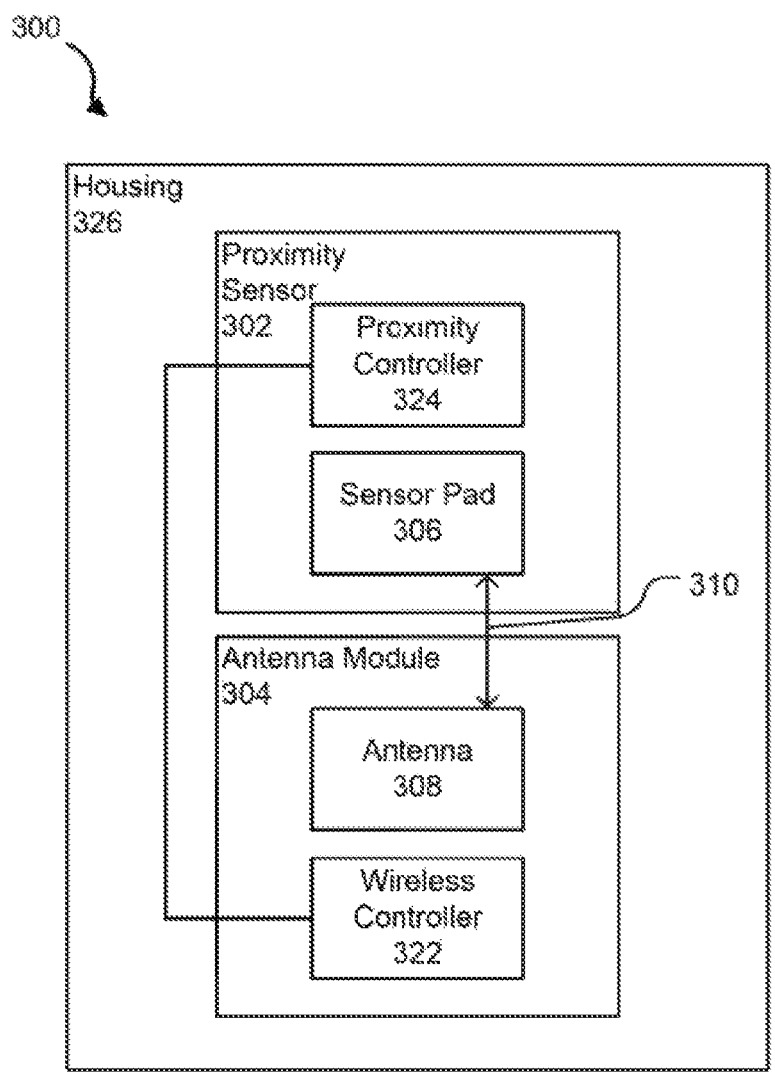
FIG. 3 is a block diagram of an example computing system including a sensor pad to capacitively couple to an antenna module.

FIG. 3 illustrates another example of a computing system 300 including a proximity sensor 302 having a sensor pad 306, and an antenna module 304 having an antenna 308 within a threshold distance 310 of at least a portion of the sensor pad 306. As shown, the antenna module 304 may further include a wireless controller 322 and the proximity sensor 302 may include a proximity controller 324. The computing system 300 may include a housing 326 to house the proximity sensor 302 and the antenna module 304.

In various implementations, the proximity controller 324 and/or the wireless controller 322 may be to determine whether a SAR exceeds a threshold for the proximity of the computing system 300 relative to a user of the computing system 300. In various implementations, the threshold may be an upper limit determined by, for example, a government agency. A threshold when the computing system is near a user's head, for example, may be a first value, while a threshold when the computing system is away from the user's head and near a user's extremity or torso, for example, may be a second value, typically a value larger than the first value. In response to determining that the SAR is above a threshold, the proximity controller 324 may instruct the wireless controller 322 to control the transmit power of the antenna 308 to reduce the overall SAR or may provide proximity information (e.g., data indicative of the proximity of the user to the sensor pad 306, etc.) to the wireless controller 322 so that the wireless controller 322 may control the transmit power of the antenna 308 based on the proximity information.

In various implementations, one or both of the controllers 322, 324 may be a processor configured to access instructions stored on a non-transitory computer-readable medium, an application specific integrated circuit ("ASIC"), a programmable logic device, or another component configured to control at least one other component. In various implementations, one or both of the controllers 322, 324 may be a microcontroller configured to carry out the operations related to receiving voltage related to contextual data. In other embodiments, the operations may be executed by logic at least partially comprising hardware logic. Hardware logic at least partially includes hardware, and may also include software, or firmware. Hardware logic may include electronic hardware including interconnected electronic components to perform analog or logic operations on the computing apparatus 300. Electronic hardware may include individual chips/circuits and distributed information processing systems. The operations may include reducing the communication of the antenna module 304 when a user is detected to be nearby. If a user is nearby, the sensor pad 306 may reflect a change in capacitance. In response, the computing apparatus 300 may reduce the signal strength of the antenna 308.

Although FIG. 3 depicts the proximity controller 324 as being integrated in the proximity sensor 302 and the wireless controller 322 as being integrated in the antenna module 304, in at least some implementations the proximity controller 324 may be integrated in the antenna module 304, or vice versa. In some implementations, the wireless controller 322 and the proximity controller 324 may be the same controller. In other implementations, the wireless controller 322 and/or the proximity controller 324 may be located elsewhere in the computing system 300.

Although not illustrated, the computing system 300 may include a processor, a storage device, or a memory device, or some combination thereof. The processor may be a single core processor, a multi-core processor, a computing cluster, or any number of other configurations. The processor may be implemented as Complex Instruction Set Computer (CISC) or Reduced Instruction Set Computer (RISC) processors, x86 Instruction set compatible processors, multi-core, or any other microprocessor or central processing unit (CPU). In some implementations, the main processor includes dual-core processor(s), dual-core mobile processor (s), or the like. The memory device may include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The storage device may be a non-transitory computer-readable medium having instructions stored thereon that when executed by the processor cause the computing apparatus 300 to perform operations. In some implementations, the operations may be executed by one or both of the controllers 322, 324.

Figure 4A:
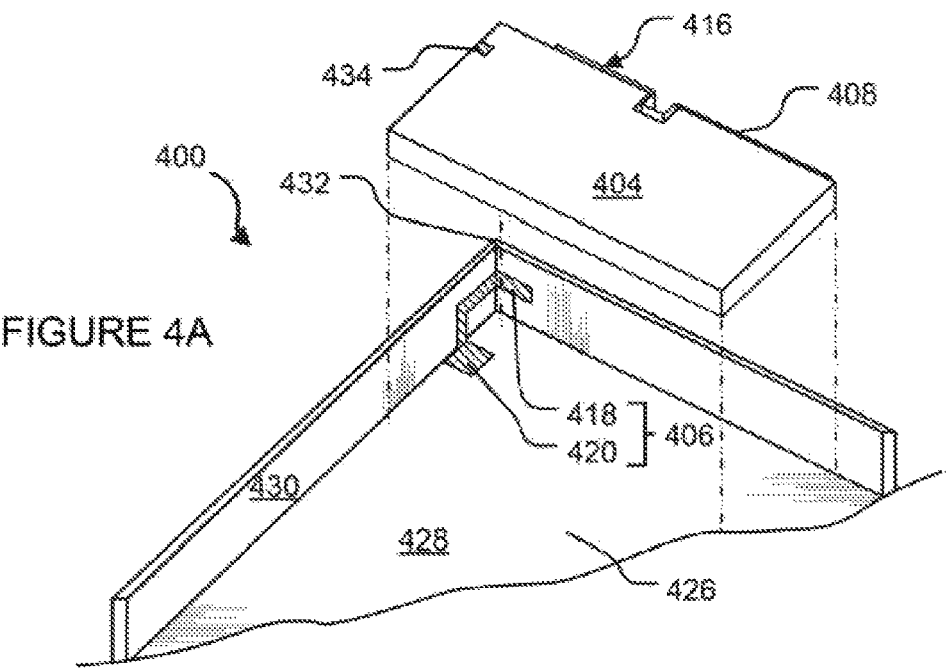
FIGS. 4A and 4B illustrate an example computing system including a sensor pad to capacitively couple to an antenna module.
Figure 4B:
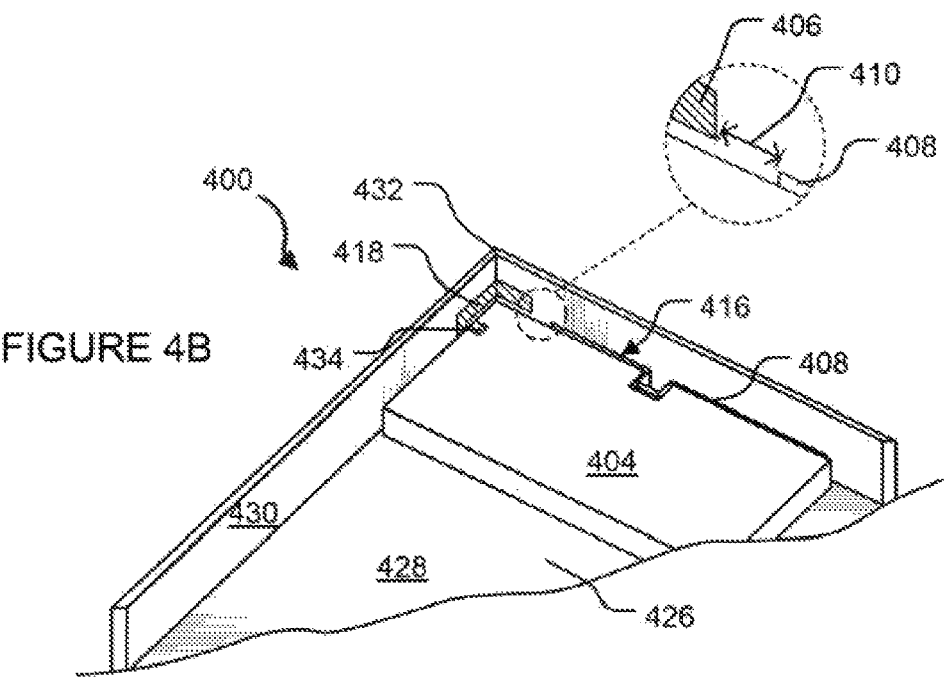

FIGS. 4A and 4B illustrate an example arrangement of a computing system 400 including a sensor pad 406 and an antenna module 404. As illustrated in FIG. 4A, the main body 420 of the sensor pad 406 may be coupled to the back-side 428 of the housing 426 and the tail 418 may be coupled to and extend along the sidewall 430 of the housing 426 such that the tail 418 is perpendicular to the main body 420. As illustrated, the tail 418 extends across the corner 432, but in other implementations the tail 41 may extend only along a sidewall 430 without traversing the corner 432. In other implementations, the tail 418 may be coupled to the back-side 428 of the housing 426 or the main body 420 of the sensor pad 406 may be coupled to the sidewall 430 of the housing 426.

As shown in FIG. 4B, the antenna module 404 may be arranged in the housing 426 such that the radiating element 16 of the antenna 408 of the antenna module 404 is disposed within a threshold distance 410 of the tail 418 to capacitively couple to the tail 18 and control a return loss and increase the bandwidth of the antenna 408.

In various implementations, the sensor pad 406 may be electrically connected to one or more other components of the proximity sensor (e.g., a proximity or capacitance measurement circuit, etc.) or computing system 400 by a conductive gasket 434, which may be located on the antenna module 404 or another component of the computing system 400. The conductive gasket 434 may be further electrically connected to another component by one or more other pathways (not illustrated) arranged within the housing 426.

Figure 5:
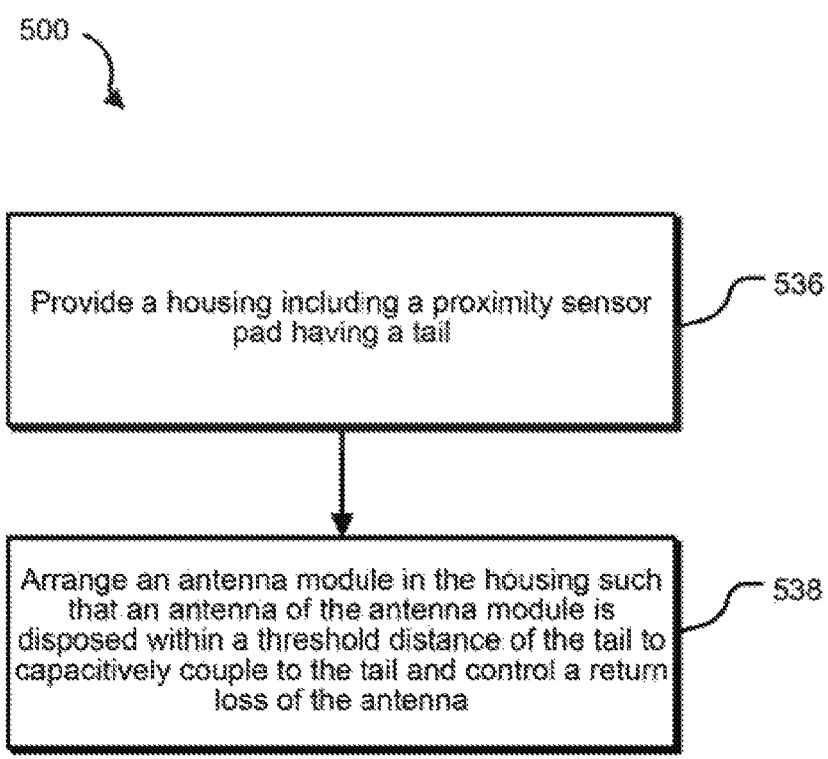
FIG. 5 is a flow diagram of an example method of making a computing system including a sensor pad to capacitively couple to an antenna module.

FIG. 5 is a flow diagram illustrating an example method 500 for making a computing system including a proximity sensor including a sensor pad with a tail, and an antenna module including an antenna within a threshold distance of the tail to capacitively couple to the tail and increase a bandwidth of the antenna. The method may be associated with the various implementations described herein, and details of the operations shown in the method 500 may be found in the related discussion of such implementations. It is noted that various operations discussed and/or illustrated may be generally referred to as multiple discrete operations in turn to help in understanding various implementations. Some implementations may include more or fewer operations than may be described.

Turning now to FIG. 5, the method 500 may begin or proceed with providing a housing including a proximity sensor pad having a tail at block 536. In various implementations, providing the housing may comprise coupling the sensor pad to the housing. In some examples, the sensor pad may be coupled to the housing such that a main body of the sensor pad is coupled to a back-side of the housing and the tail is coupled to a sidewall of the housing such that the tail is perpendicular to the main body.

The method 500 may proceed with arranging an antenna module in the housing at block 538. In various implementations, the antenna module may be arranged in the housing such that an antenna of the antenna module is disposed within a threshold distance of the tail to capacitively couple to the tail and control a return loss of the antenna. In some examples, the threshold distance may depend in some instances on the particular arrangement and configuration of the sensor pad and the antenna, the threshold distance for at least some implementations may be about 3 mm or less than 3 mm. In other implementations, the threshold distance may be greater than 3 mm.

Although certain implementations have been illustrated and described herein, it will be appreciated by those of ordinary skill in the art that a wide variety of alternate and/or equivalent implementations calculated to achieve the same purposes may be substituted for the implementations shown and described without departing from the scope of this disclosure. Those with skill in the art will readily appreciate that implementations may be implemented in a wide variety of ways. This application is intended to cover any adaptations or variations of the implementations discussed herein. It is manifestly intended, therefore, that implementations be limited only by the claims and the equivalents thereof.

What is claimed is:

1. A computing system comprising:
    a proximity sensor including a sensor pad with a tail; and
    an antenna module including an antenna wherein a threshold distance is disposed between the antenna and the tail to capacitively couple the antenna to the tail and increase a bandwidth of the antenna.

2. The computing system of claim 1, further comprising a housing to house the proximity sensor and the antenna module.

3. The computing system of claim 2, wherein a main body of the sensor pad is coupled to a back-side of the housing and the tail is coupled to a sidewall of the housing such that the tail is perpendicular to the main body.

4. The computing system of claim 2, wherein the tail of the proximity sensor extends along a sidewall of the housing.

5. The computing system of claim 4, wherein the sidewall includes a corner, and wherein the tail extends across the corner.

6. The computing system of claim 2, wherein the radiating element extends along the sidewall of the housing.

7. The computing system of claim 1, wherein the threshold distance is about 3 mm.

8. The computing system of claim 1, wherein the antenna module comprises an inverted-F antenna.

9. The computing system of claim 1, wherein the sensor pad and the tail comprise a conductive foil.

10. A computing system comprising:
    an antenna;
    a sensor pad to detect proximity of a user, wherein a tail of the sensor pad is arranged to capacitively couple to a radiating element of the antenna to increase a bandwidth of the antenna; and
    a controller to control a transmit power of the antenna when a user is detected by the sensor pad.

11. The computing system of claim 10, wherein the antenna and the controller are included in an antenna module.

12. The computing system of claim 11, further comprising proximity sensor circuitry coupled to the sensor pad, wherein the proximity sensor circuitry is included in the antenna module.

13. The computing system of claim 10, wherein the computing system is at least one of a desktop computer, a laptop computer, a handheld computer, a tablet computer, a netbook computer, a convertible computer, a display device, a server, a set-top box, a digital recorder, a game console, a smart phone, a personal digital assistant, a mobile phone, a digital media player, a television, and a digital camera.

14. A method comprising:
    providing a housing including a proximity sensor pad having a tail; and
    arranging an antenna module in the housing such that a threshold distance is disposed between an antenna of the antenna module and the tail to capacitively couple to the tail and control a return loss of the antenna.

15. The method of claim 14, wherein said providing comprises coupling the sensor pad to the housing such that a main body of the sensor pad is coupled to a back-side of the housing and the tail is coupled to a sidewall of the housing such that the tail is perpendicular to the main body.

* * * * *